United States Patent
Dodson et al.

(10) Patent No.: US 6,628,309 B1
(45) Date of Patent: Sep. 30, 2003

(54) WORKSPACE DRAG AND DROP

(75) Inventors: John Paul Dodson, Pflugerville, TX (US); Hatim Yousef Amro, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/246,022

(22) Filed: Feb. 5, 1999

(51) Int. Cl.⁷ .............................. G06F 3/00
(52) U.S. Cl. ............... 345/769; 345/778; 345/781
(58) Field of Search ................... 345/348, 339, 345/172, 145, 346, 340, 568, 835, 769, 856, 804, 781, 778; 707/530, 539, 531; 715/530, 539, 531

(56) References Cited

U.S. PATENT DOCUMENTS

| | | | | |
|---|---|---|---|---|
| 4,896,290 A | * | 1/1990 | Rhodes et al. ............... 710/67 |
| 5,422,993 A | * | 6/1995 | Fleming ..................... 345/835 |
| 5,608,850 A | * | 3/1997 | Robertson ................... 345/427 |
| 5,689,664 A | * | 11/1997 | Narayanan .................. 345/340 |
| 5,874,958 A | * | 2/1999 | Ludolph ..................... 345/339 |
| 5,920,312 A | * | 7/1999 | Wagner et al. .............. 345/333 |
| 6,175,364 B1 | * | 1/2001 | Wong et al. ................ 345/340 |
| 6,246,411 B1 | * | 6/2001 | Strauss ....................... 345/863 |

* cited by examiner

*Primary Examiner*—John Cabeca
*Assistant Examiner*—Kieu D. Vu
(74) *Attorney, Agent, or Firm*—J. Bruce Schelkopf; Sawyer Law Group

(57) ABSTRACT

The present invention provides a method and system for a drag and drop in a computer system. The method includes beginning a drag and drop on an object in a first workspace, suspending the drag and drop, activating a second workspace, and resuming the drag and drop in the second workspace. The method of the present invention provides a drag and drop for a multiple workspace environment. The drag and drop is performed in one multi-step operation. This simplifies the moving of objects between workspaces and provides a graphical operation.

25 Claims, 4 Drawing Sheets

WORKSPACE DRAG AND DROP

FIELD OF THE INVENTION

The present invention relates to computer systems, and more particularly to the moving of objects in computer systems.

BACKGROUND OF THE INVENTION

Many operating systems, including windows-based operating systems, provide a graphical drag and drop for the moving of objects, or files, from one area of the desktop directly to another area of the desktop. FIG. 1 illustrates a conventional computer system which provides such a drag and drop. The computer system 100 comprises a central processing unit 102, a graphic user interface (GUI) manager 104, and a display mechanism 106, such as a computer monitor. The display mechanism 106 displays a single workspace 112 with open windows 108 and 110. The drag and drop operation allows a user to select an object 114 residing in window 108 and drag it to a visible window, such as window 110, where it is dropped. Window 110 is referred to as the "drop zone." In this manner, a user may move objects around the workspace in a user-friendly, graphic way.

FIG. 2 illustrates another conventional computer system which has multiple workspaces. In this computer system 200, a user may have access to more than one workspace, each running its own set of applications. An example of a conventional multiple workspace system is the Common Desktop Environment (CDE). The computer system 200 comprises a CPU 102, GUI manager 104, and a display mechanism 106. The display mechanism's displays multiple workspaces, 208, 210, 212, and 214. However, only one workspace can be displayed at a time. For example, the system 200 may have four workspaces 208, 210, 212, and 214. While workspace 208 is visible, workspaces 210, 212, and 214 are represented by buttons on a front panel 206. When the user wishes to move to a different workspace, he/she selects the button for that workspace. That workspace would then replace workspace 208 in the display while workspace 208 would be represented by a button on the front panel 206.

This is a problem because sometimes it is desirable to drag and drop between workspaces within a workspace-based desktop. However, conventional drag and drop between workspaces can not be supported because the drop zone is not visible while the drag and drop operation is in progress. The user may move objects between workspaces by accessing the workspaces' common file system, however, the moving of an object requires multiple operations and is not graphical. Conventional methods of moving objects between workspaces is thus cumbersome.

Accordingly, what is needed is a system and method for providing a drag and drop between workspaces in one operation in a computer system. The present invention addresses such a need.

SUMMARY OF THE INVENTION

The present invention provides a method and system for a drag and drop in a computer system. The method includes beginning a drag and drop on an object in a first workspace, suspending the drag and drop, activating a second workspace, and resuming the drag and drop in the second workspace. The method of the present invention provides a drag and drop for a multiple workspace environment. The drag and drop provides is performed in one multi-step operation. This simplifies the moving of objects between workspaces and provides a graphical operation.

DETAILED DESCRIPTION OF THE INVENTION

The present invention is a system and method for providing a drag and drop between workspaces in one operation in a computer system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 3 and 4 in conjunction with the discussion below.

Figure 3:
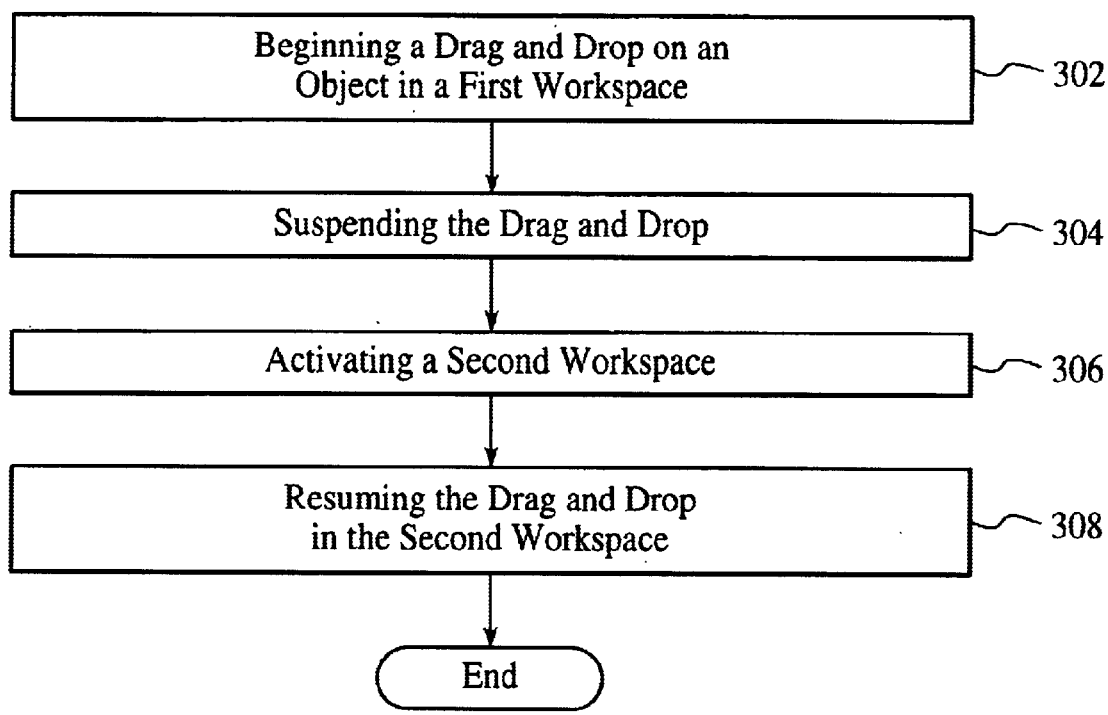
FIG. 3 is a flow chart illustrating a preferred embodiment of the method for providing a drag and drop between workspaces in one operation in accordance with the present invention.

FIG. 3 is a flow chart illustrating a preferred embodiment of a method for providing a drag and drop between workspaces in one operation in accordance with the present invention. First, the drag and drop operation is begun on an object in a first workspace, via step 302. In the preferred embodiment, the drag and drop is begun with the user selecting the object in the first workspace and proceeding to drag the object. Next, the drag and drop is suspended, via step 304. Next, a second workspace is activated, via step 306. This second workspace contains the drop zone. Then, the drag and drop is resumed in the second workspace, via step 308, and the object is dropped in the drop zone. Thus, the method of the present invention provides a drag and drop between workspaces in one operation.

Figure 4:
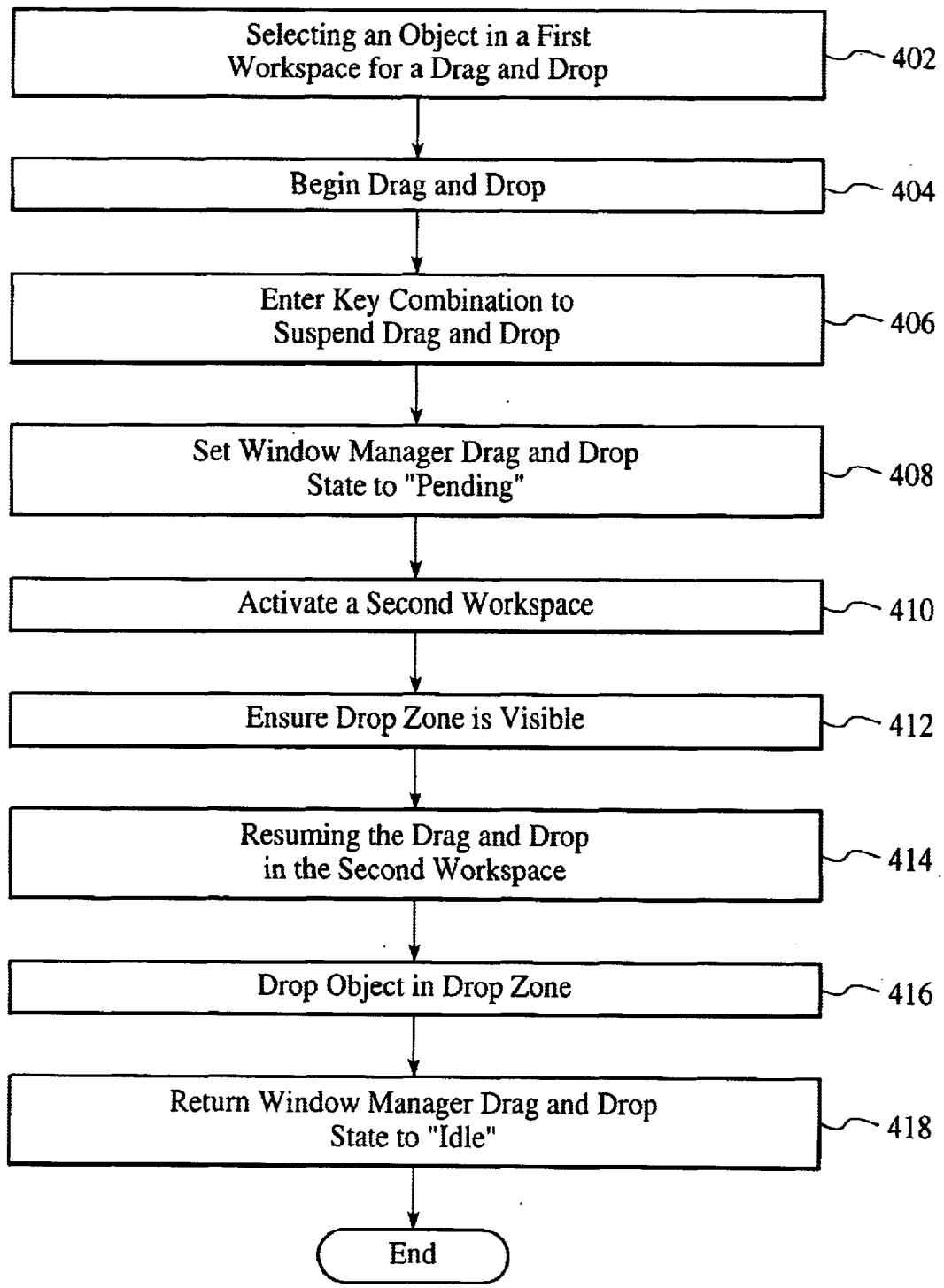
FIG. 4 is a flow chart illustrating in more detail the preferred embodiment of the method for providing a drag and drop between workspaces in one operation in accordance with the present invention.

FIG. 4 is a flow chart illustrating in more detail the preferred embodiment of the method for providing a drag and drop between workspaces in one operation in accordance with the present invention. First, an object in a first workspace is selected for the drag and drop, via step 402. Next, the user begins the drag and drop, via step 404, for example, by proceeding to drag the object. Next, the user enters a key combination, for example Alt+Shift+Right Mouse Button, to suspend the drag and drop, via step 406. The key combination transitions the window manager's drag and drop state to "pending",via step 408. The drag and drop state is an additional state which indicates whether or not the system is in the midst of a drag and drop operation.

The user next activates the second workspace which contains the drop zone, via step 410, and also ensures that the drop zone is visible, via step 412. In the preferred embodiment, the window which contains the drop zone is selected, bringing the window to the foreground. In this manner, the drop zone in the window is made visible. Then, the drag and drop is resumed in the second workspace, via step 414, with the same key combination, toggling the suspension and resumption of the drag and drop. Although the preferred embodiment discloses using this particular key combination, any key combination may be used without departing from the spirit and scope of the present invention.

When the drag and drop is resumed, the object is dropped in the drop zone, via step 416. This returns the window manager's drag and drop state to "idle", via step 418.

Figure 1:
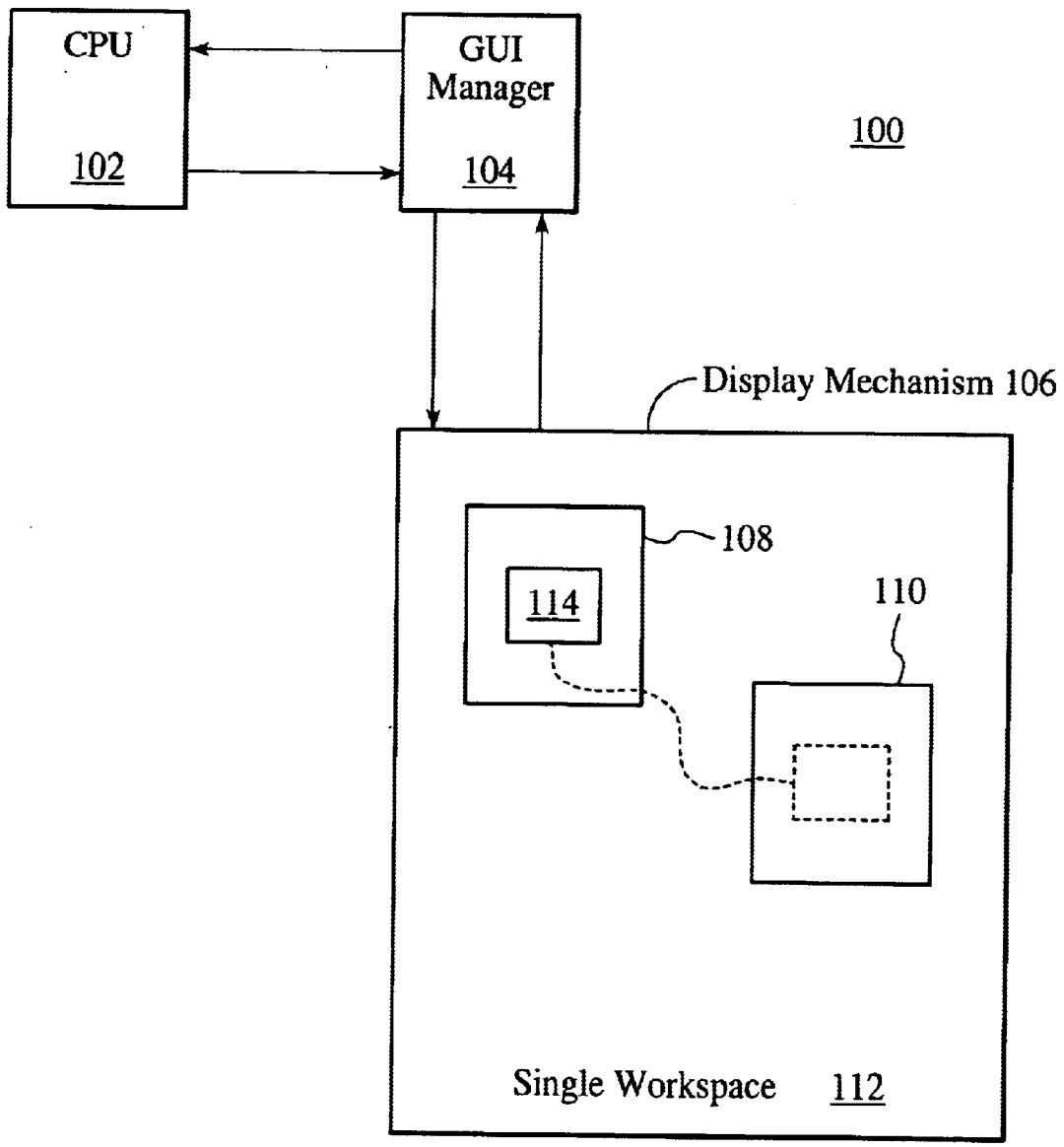
FIG. 1 illustrates a conventional single workspace computer system.
Figure 2:
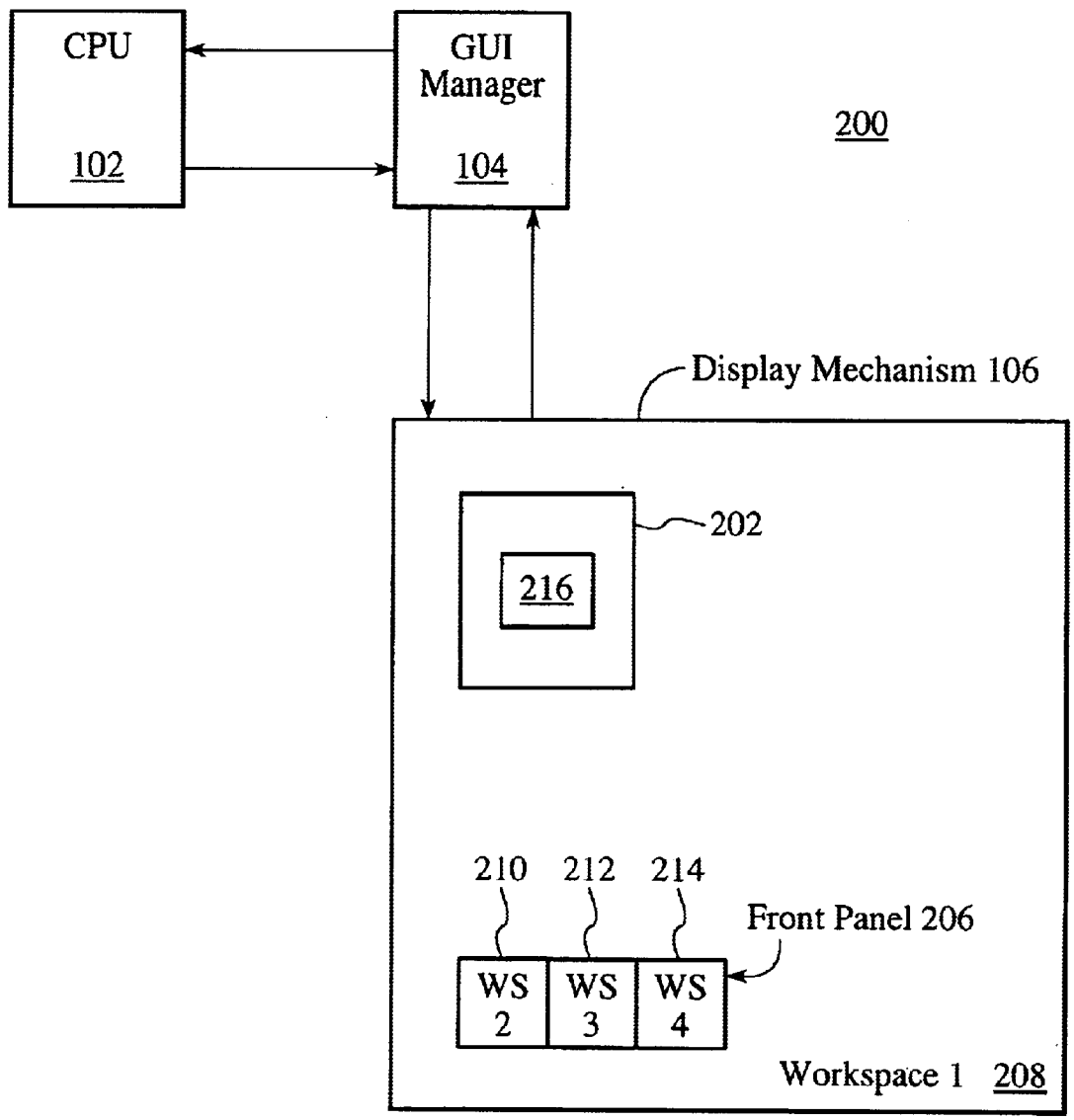
FIG. 2 illustrates a conventional multiple workspace computer system.

For example, assume that the windows system 200 illustrated in FIG. 2 is upgraded to provide the drag and drop in accordance with the present invention. Assume also that the system contains four workspaces 208, 210, 212, and 214. The user is currently in workspace 208 and wishes to drag an object 216 to workspace 214. First, the user selects object 216, via step 402 (FIG. 4). Next, the user begins the drag and drop, via step 404, by dragging the object. Next, the user enters the key combination Alt+Shift+Right Mouse Button to suspend the drag and drop, via step 406. This sets the windows manager's drag and drop state to "pending", via step 408. The user next activates workspace 214, via step 410, and then ensures that the drop zone (not shown) is visible in workspace 214, via step 412. Once workspace 214 and the drop zone are activated, the user resumes the drag and drop, via step 414, by entering the key combination again. The user may then drop the object 216 into the drop zone in workspace 214 since the drop zone is now visible, via step 416. This returns the windows manager's drag and drop state to "idle", via step 418.

A method and system for providing a drag and drop between workspaces in one operation in a computer system has been disclosed. The method of the present invention provides a drag and drop for a multiple workspace environment. The drag and drop provided is performed in one multi-step operation. This simplifies the moving of objects between workspaces and provides a graphical method for the operation.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing a drag and drop in a computer system, the computer system having multiple workspaces, comprising the steps of:
   (a) beginning a drag and drop on an object in a first workspace, wherein the first workspace provides a first computer environment for running a first set of applications;
   (b) suspending the drag and drop;
   (c) activating a second workspace residing on a same computer system as the first workspace, wherein the second workspace provides a second computer environment separate from the first computer environment for running a second set of applications; and
   (d) resuming the drag and drop in the second workspace.

2. The method of claim 1, wherein the suspending step (b) comprises:

(b1) entering a key combination to suspend the drag and drop;
   (b2) activating the second workspace; and
   (b3) ensuring the drop zone in the second workspace is visible.

3. The method of claim 2, wherein the entering step (b1) sets a window manager drag and drop state to "pending".

4. The method of claim 1, further comprising:
   (e) dropping the object in a drop zone in the second workspace.

5. The method of claim 4, wherein the dropping step (e) returns a window manager drag and drop state to "idle".

6. A system for providing a drag and drop in a computer system, comprising:
   a central processing unit having a first workspace for providing a first computer environment for running a first set of applications, and a second workspace for providing a second computer environment separate from the first computer environment for running a second set of applications;
   a graphical user interface manager coupled to the central processing unit; and
   a display mechanism coupled to the graphical user interface manager, the display mechanism displaying a drag and drop of an object between the first and second workspaces, the drag and drop comprising the beginning of the drag and drop on the object in the first workspace, suspending the drag and drop, activating the second workspace, and resuming the drag and drop in the second workspace.

7. The system of claim 1, wherein the suspending of the drag and drop displayed by the display mechanism comprises:
   entering a key combination to suspend the drag and drop;
   activating the second workspace; and
   ensuring the drop zone in the second workspace is visible.

8. The system of claim 7, wherein the entering of the key combination sets a window manager drag and drop state in the computer system to "pending".

9. The system of claim 6, wherein the display of the display mechanism further comprises:
   dropping the object in a drop zone in the second workspace.

10. The system of claim 9, wherein the dropping of the object returns a window manager drag and drop state in the computer system to "idle".

11. A method for providing a drag and drop in a computer system, the computer system having multiple workspaces, comprising the steps of:
    (a) beginning a drag and drop on an object in a first workspace, wherein the first workspace provides a first computer environment for running a first set of applications;
    (b) entering a key combination to suspend the drag and drop;
    (c) activating a second workspace residing on a same computer system as the first workspace, wherein the second workspace provides a second computer environment separate from the first computer environment for running a second set of applications;
    (d) ensuring a drop zone in the second workspace is visible; and
    (e) resuming the drag and drop in the second workspace.

12. The method of claim 11, wherein the entering step (b) sets a window manager drag and drop state to "pending".

13. The method of claim 11, further comprising:

(f) dropping the object in the drop zone in the second workspace.

14. The method of claim 13, wherein the dropping step (f) returns a window manager drag and drop state to "idle".

15. A system for providing a drag and drop in a computer system, comprising:

a central processing unit having a first workspace for providing a first computer environment for running a first set of applications, and a second workspace for providing a second computer environment separate from the first computer environment for running a second set of applications;

a graphical user interface manager coupled to the central processing unit; and a display mechanism coupled to the graphical user interface manager, the display mechanism displaying a drag and drop of an object between the first and second workspaces, the drag and drop comprising the beginning of the drag and drop on the object in the first workspace, entering a key combination to suspend the drag and drop, activating the second workspace, ensuring a drop zone in the second workspace is visible, and resuming the drag and drop in the second workspace.

16. The system of claim 15, wherein the entering of the key combination sets a window manager drag and drop state in the computer system to "pending".

17. The system of claim 15, wherein the display of the display mechanism further comprises:

dropping the object in a drop zone in the second workspace.

18. The system of claim 17, wherein the dropping of the object returns a window manager drag and drop sate in the computer system to "idle".

19. A method for providing a drag and drop in a computer system, the computer system having multiple workspaces, comprising the steps of:

(a) beginning a drag and drop on an object in a first workspace, wherein the first workspace provides a first computer environment for running a first set of applications;

(b) entering a key combination to suspend the drag and drop;

(c) activating a second workspace residing on a same computer system as the first workspace, wherein the second workspace provides a second computer environment separate from the first computer environment for running a second set of applications;

(d) ensuring a drop zone in the second workspace is visible;

(e) resuming the drag and drop in the second workspace; and (f) dropping the object in the drop zone in the second workspace.

20. The method of claim 19, wherein the entering step (b) sets a window manager drag and drop state to "pending".

21. The method of claim 19, wherein the dropping step (f) returns a window manager drag and drop state to "idle".

22. A system for providing a drag and drop in a computer system, comprising:

a central processing unit having a first workspace for providing a first computer environment for running a first set of applications, and a second workspace for providing a second computer environment separate from the first computer environment for running a second set of applications;

a graphical user interface manager coupled to the central processing unit; and a display mechanism coupled to the graphical user interface manager, the display mechanism displaying a drag and drop of an object between the first and second workspaces, the drag and drop comprising the beginning of the drag and drop on the object in the first workspace, entering a key combination to suspend the drag and drop, activating the second workspace, ensuring a drop zone in the second workspace is visible, resuming the drag and drop in the second workspace, and dropping the object in a drop zone in the second workspace.

23. The system of claim 22, wherein the entering of the key combination sets a window manager drag and drop state in the computer system to "pending".

24. The system of claim 22, wherein the dropping of the object returns a window manager drag and drop sate in the computer system to "idle".

25. A computer readable medium with computer instructions for providing a drag and drop in a computer system, the computer system having multiple workspaces, the computer instructions for:

(a) beginning a drag and drop on an object in a first workspace, wherein the first workspace provides a first computer environment for running a first set of applications;

(b) suspending the drag and drop;

(c) activating a second workspace residing on a same computer system as the first workspace, wherein the second workspace provides a second computer environment separate from the first computer environment for running a second set of applications; and (d) resuming the drag and drop in the second workspace.

* * * * *